(12) United States Patent
Kim et al.

(10) Patent No.: US 12,428,610 B2
(45) Date of Patent: Sep. 30, 2025

(54) COMPOSITE GLASS COMPOSITION FOR WASHING AND CLEANING AND METHOD FOR PRODUCING COMPOSITE GLASS POWDER USING THE SAME

(71) Applicant: LG ELECTRONICS INC., Seoul (KR)

(72) Inventors: Jingon Kim, Seoul (KR); Young Seok Kim, Seoul (KR); Namjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 17/802,200

(22) PCT Filed: Nov. 19, 2020

(86) PCT No.: PCT/KR2020/016334
§ 371 (c)(1),
(2) Date: Aug. 25, 2022

(87) PCT Pub. No.: WO2021/172705
PCT Pub. Date: Sep. 2, 2021

(65) Prior Publication Data
US 2023/0089989 A1    Mar. 23, 2023

(30) Foreign Application Priority Data

Feb. 26, 2020    (KR) .................. 10-2020-0023605

(51) Int. Cl.
| | | |
|---|---|---|
| C11D 3/395 | (2006.01) | |
| C03C 3/076 | (2006.01) | |
| C03C 4/00 | (2006.01) | |
| C03C 14/00 | (2006.01) | |
| C11D 3/12 | (2006.01) | |
| C11D 3/48 | (2006.01) | |
| C11D 11/00 | (2006.01) | |
| C11D 17/06 | (2006.01) | |
| C03C 12/00 | (2006.01) | |

(52) U.S. Cl.
CPC ............ *C11D 3/3951* (2013.01); *C03C 3/076* (2013.01); *C03C 4/00* (2013.01); *C03C 14/004* (2013.01); *C11D 3/124* (2013.01); *C11D 3/3953* (2013.01); *C11D 3/48* (2013.01); *C11D 11/0082* (2013.01); *C11D 17/06* (2013.01); *C03C 12/00* (2013.01); *C03C 2204/02* (2013.01); *C11D 2111/12* (2024.01)

(58) Field of Classification Search
CPC ...... C11D 3/3951; C11D 3/124; C11D 3/3953; C11D 3/48; C11D 11/0082; C11D 17/06; C11D 2111/12; C03C 3/076; C03C 4/00; C03C 14/004; C03C 12/00; C03C 2204/02
See application file for complete search history.

(56) References Cited

U.S. PATENT DOCUMENTS

| | | | | |
|---|---|---|---|---|
| 2,434,674 | A | * | 1/1948 | Pincus .................... C11D 3/06 516/122 |
| 3,158,515 | A | * | 11/1964 | Michael ................. C03C 3/064 501/77 |
| 4,379,069 | A | | 4/1983 | Rapisarda et al. |
| 4,512,908 | A | | 4/1985 | Heile |
| 7,435,714 | B2 | | 10/2008 | Kottke et al. |
| 7,456,143 | B2 | | 11/2008 | Speckmann et al. |
| 7,709,027 | B2 | | 5/2010 | Fechner et al. |
| 2004/0087459 | A1 | | 5/2004 | Lentsch et al. |
| 2004/0253321 | A1 | | 12/2004 | Fechner et al. |
| 2004/0254090 | A1 | | 12/2004 | Lentsch et al. |
| 2005/0239681 | A1 | | 10/2005 | Speckmann et al. |
| 2006/0014658 | A1 | | 1/2006 | Zimmermann et al. |
| 2006/0040841 | A1 | | 2/2006 | Lentsch et al. |
| 2006/0063693 | A1 | | 3/2006 | Jakob et al. |
| 2006/0079437 | A1 | | 4/2006 | Kondo et al. |
| 2006/0148669 | A1 | | 7/2006 | Ulrike Kottke et al. |

FOREIGN PATENT DOCUMENTS

| | | |
|---|---|---|
| CN | 1243537 | 2/2000 |
| CN | 1468813 | 1/2004 |
| CN | 1754953 | 4/2006 |
| CN | 101 239 839 | 8/2008 |
| CN | 103 601 370 | 1/2016 |
| CN | 109576077 | 4/2019 |

(Continued)

OTHER PUBLICATIONS

Extended European Search Report dated Mar. 22, 2024 issued in Application No. 20921724.9.

(Continued)

*Primary Examiner* — Elizabeth A. Bolden
(74) *Attorney, Agent, or Firm* — KED & ASSOCIATES, LLP

(57) ABSTRACT

Disclosed are a composite glass composition for washing and cleaning and a method for producing composite glass powder using the same, in which a silicate-based glass composition containing an alkali oxide for activating water into alkaline water and a bleaching agent having bleaching performance are mixed or coated. Accordingly, since the silicate-based glass composition containing an alkali oxide can ionize water in place of a surfactant contained in existing synthetic detergents, washing and cleaning capacity equivalent to or greater than existing synthetic detergents can be secured with alkaline water ionized from water.

14 Claims, 2 Drawing Sheets

(56) References Cited

FOREIGN PATENT DOCUMENTS

| | | | |
|---|---|---|---|
| EP | 1 083 147 | 3/2001 | |
| EP | 1083147 A2 * | 3/2001 | ............ C01B 33/32 |
| GB | 1 538 893 | 1/1979 | |
| JP | 06-128590 | 5/1994 | |
| JP | 2001-122614 | 5/2001 | |
| JP | 2004-050044 | 2/2004 | |
| JP | 2005-501113 | 1/2005 | |
| KR | 10-2001-0089638 | 10/2001 | |
| KR | 10-2003-0074570 | 9/2003 | |
| KR | 10-2005-0089974 | 9/2005 | |
| KR | 10-2013-0099766 | 9/2013 | |
| KR | 10-2015-0052445 | 5/2015 | |

OTHER PUBLICATIONS

Chinese Office Action dated Mar. 30, 2023 issued in Application No. 202080097324.5.
International Search Report dated Mar. 3, 2021 issued in Application No. PCT/KR2020/016334.

* cited by examiner

COMPOSITE GLASS COMPOSITION FOR WASHING AND CLEANING AND METHOD FOR PRODUCING COMPOSITE GLASS POWDER USING THE SAME

CROSS-REFERENCE TO RELATED PATENT APPLICATIONS

This application is a U.S. National Stage Application under 35 U.S.C. § 371 of PCT Application No. PCT/KR2020/016334, filed Nov. 19, 2020, which claims priority to Korean Patent Application No. 10-2020-0023605, filed Feb. 26, 2020, whose entire disclosures are hereby incorporated by reference.

BACKGROUND

Technical Field

The present disclosure relates to a composite glass composition for washing and cleaning, and a method for producing composite glass powder using the same.

Background Art

Generally, a process of removing dirt or contaminants from fabric or clothes may be called washing, and a process of removing leftover food or contaminants from dishes may be called also washing (or cleaning).

Such washing and cleaning mean the removal of contaminants by dissolving a surfactant in water and increasing the alkalinity of the water.

Since a washing and cleaning method using a synthetic detergent consumes a large amount of water, so the removal effect on water-based contaminants can be excellent, but there is a limit to the removal of oil-based contaminants.

In addition, a conventional synthetic detergent washes off dirt, leftover or contaminants stuck on clothes or dishes by using straight-chain alkylbenzene, anionic surfactants, builders, etc, and dry them.

However, when using the conventional synthetic detergent in the washing and cleaning, there might be a problem of causing environmental pollution due to the surfactant that is not dissolved in water and causes eutrophication.

CITED DOCUMENT

Patent Cited Document (Patent Cited Document 1) Korean Patent Publication No. 10-2001-0089638 (published on Oct. 6, 2001)

DESCRIPTION OF DISCLOSURE

Technical Problems

Accordingly, an object of the present disclosure is to address the above-noted and other problems and to provide a composite glass composition for washing and cleaning including a silicate-base glass composition containing alkaline oxide that may ionize water, instead of the surfactant contained in the conventional synthetic detergent, and a method for producing composite glass powder using the same.

Another object of the present disclosure is to provide a composite glass composition for washing and cleaning that may function to neutralize pH by using a silicate-base glass composition containing an alkaline oxide, even if weakly acidic wastewater is drawn during a washing or cleaning process, thereby causing no environmental pollution, and a method for producing composite glass powder using the same.

A further object of the present disclosure is to provide a composite glass composition for washing and cleaning that may be used as a composite detergent for washing and cleaning used after being added to a washing machine, a dryer, a dishwasher used together with water, and a method for producing composite glass powder using the same.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

To solve the above technical problems, a composite glass composition for washing and cleaning and a method for producing composite glass powder using the same according to the present disclosure may mix or coat a silicate-based glass composition containing an alkali oxide for activating water into alkaline water with a bleaching agent having a bleaching function.

Accordingly, the silicate-base glass composition containing the alkaline oxide for ionizing water, instead of the surfactant contained in the conventional synthetic detergent, thereby securing washing and cleaning performance equal to or greater than the conventional synthetic detergent only by using the alkaline water ionized from water.

Further, the silicate-base glass composition containing the alkaline oxide for ionizing water, instead of the surfactant contained in the conventional synthetic detergent. Accordingly, the composite glass composition for washing and cleaning and the method for producing the composite glass powder using the same according to the present disclosure may fundamentally exclude the user of surfactants not soluble in water and causing eutrophication, thereby preventing environmental problems in advance.

To this end, the composite glass composition for washing and cleaning according to an embodiment of the present disclosure may include a glass composition and a bleaching agent mixed with the glass composition.

Here, to express the washing activity, the glass composition may include an alkali oxide configure to ionize water into alkaline water when used together with water.

More specifically, the glass composition may include 40 to 75 wt % of $SiO_2$, and 30 to 60 wt % of the sum of $Na_2O$, $K_2O$ and $Li_2O$.

Advantageous Effect

The present disclosure may have following advantageous effects. The composite glass composition for washing and cleaning and the method for producing composite glass powder using the same according to the present disclosure may mix or coat a silicate-based glass composition containing an alkali oxide for activating water into alkaline water with a bleaching agent having a bleaching function.

Accordingly, the silicate-base glass composition containing the alkaline oxide for ionizing water, instead of the surfactant contained in the conventional synthetic detergent, thereby securing washing and cleaning performance equal to or greater than the conventional synthetic detergent only by using the alkaline water ionized from water.

Further, the silicate-base glass composition containing the alkaline oxide for ionizing water, instead of the surfactant contained in the conventional synthetic detergent. Accordingly, the composite glass composition for washing and cleaning and the method for producing the composite glass powder using the same according to the present disclosure may fundamentally exclude the user of surfactants not soluble in water and causing eutrophication, thereby preventing environmental problems in advance.

In other words, the conventional surfactants are not soluble in water. Because of that, they are main causes of water pollution.

On the other hand, in the composite glass composition for washing according to the embodiment of the present disclosure, water may meet a glass composition to create alkaline water. At this time, water molecules may be broken down into cluster water molecules under the influence of ionization, and the water molecules may penetrate into the contaminants (or dirt) so that OH-molecules may surround the contaminants (dirt) to weaken the bonding force between the textile and the contaminants.

Accordingly, the composite glass composition for washing according to the embodiment may contain an alkali oxide. When it is mixed with wastewater that is weakly acidic, the composite glass composition may function to neutralize pH and there may be no risk of environmental pollution.

The composite glass powder for washing produced by using the composite glass composition according to the present disclosure may be a composite detergent for washing used when added in a washing machine, a dryer, a dishwasher and the like together with water.

Specific effects are described along with the above-described effects in the section of Detailed Description.

DETAILED DESCRIPTION OF EXEMPLARY EMBODIMENT

Figure 1:
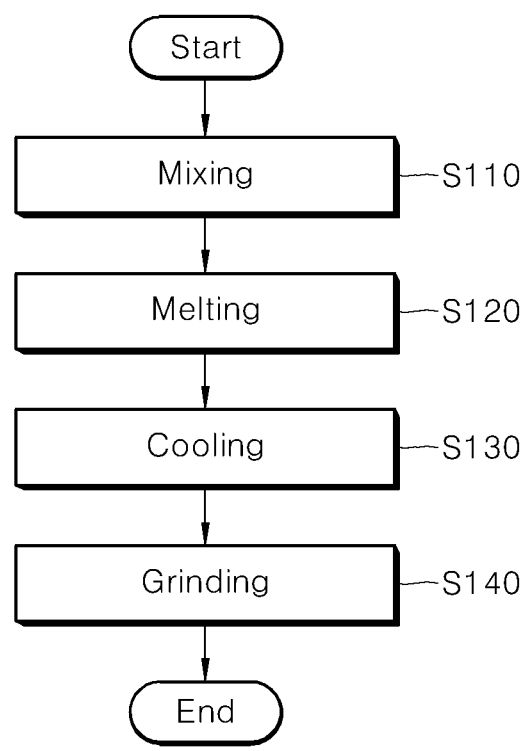
FIG. 1 is a flow chart showing a method for producing composite glass powder for washing and cleaning according to an embodiment of the present disclosure.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Hereinafter, a composite glass for washing and cleaning and a method for producing composite glass powder according to several embodiments of the present disclosure will be described.

A composite glass composition for washing and cleaning (hereinafter, for washing) according to an embodiment of the present disclosure may be mixed or coated with a silicate-base glass composition containing an alkali oxide for activating water to alkaline water and a bleaching agent having a bleaching function Accordingly, the silicate-base glass composition containing the alkali oxide may ionize water by replacing the role of the surfactant contained in the conventional synthetic detergent, thereby securing the washing capacity equivalent to or higher than that of the conventional synthetic detergents, with alkaline water ionized from water.

In addition, the composite glass composition for washing according to the embodiment may include the silicate-base glass composition containing the alkali oxide may replace the role of the surfactant, and the use of the surfactant causing eutrophication and not soluble in water may be fundamentally excluded, thereby preventing environmental pollution problems in advance.

In other words, conventional surfactants are not soluble in water, which becomes the main cause of water pollution.

On the other hand, in the composite glass composition for washing according to the embodiment of the present disclosure, water may meet a glass composition to create alkaline water. At this time, water molecules may be broken down into cluster water molecules under the influence of ionization, and the water molecules may penetrate into the contaminants (or dirt) so that OH-molecules may surround the contaminants (dirt) to weaken the bonding force between the textile and the contaminants.

Accordingly, the composite glass composition for washing according to the embodiment may contain an alkali oxide. When it is mixed with wastewater that is weakly acidic, the composite glass composition may function to neutralize pH and there may be no risk of environmental pollution.

The composite glass powder for washing produced by using the composite glass composition according to the present disclosure may be a composite detergent for washing used when added in a washing machine, a dryer, a dishwasher and the like together with water.

To this end, the composite glass for washing according to the embodiment of the present disclosure may include a glass composition, a bleaching agent mixed with the glass composition.

In this instance, to activate washing force, the glass composition may contain an alkali oxide configured to activate water into alkaline water when used with water.

The glass composition may include 40 to 60 wt % of $SiO_2$, and 30 to 60 wt % of the sum of $Na_2O$, $K_2O$ and $Li_2O$.

$SiO_2$ is a glass former configured to facilitate vitrification, and a key component that serves as a structural framework of glass. In addition, although not acting as a direct component for expressing antimicrobial activity, $SiO_2$ forms less OH groups on a glass surface, compared to $P_2O_5$ which is a representative glass former so that it is advantageous in facilitating metal ions to positively charge the glass surface.

$SiO_2$ may be preferably contained in a content ratio of 40 to 70% wt of the total weight of the antimicrobial glass composition according to the present disclosure. 50 to 60 wt % may be more preferred. When $SiO_2$ is added in a large amount in excess of 70 wt %, there could be a problem in that workability and production yield are deteriorated in a cooling process as the viscosity increases in a glass melting process. Conversely, when $SiO_2$ is added in an amount of less than 40 wt %, there could be a problem in that the glass structure is weakened and water resistance is lowered.

Alkali oxides such as $Na_2O$, $K_2O$ and $Li_2O$ are oxides configured to act as a network modifier for non-cross linking in the glass composition. Those components cannot be vitrified alone but vitrification may be possible when they are mixed with a network former such as $SiO_2$ and $B_2O_3$ in a certain ratio. In the present disclosure, $SiO_2$ may act as a support, and the content of $SiO_2$ may increase to a predetermined level or more. When the content of the alkali oxide is lowered, durability may increase but washing performance for contaminants may decrease. When the content of the alkali oxide is increased to a predetermined level of more, durability may decrease but the washing performance may decrease.

If only one of those components is contained in the glass composition, the durability of the glass might be weakened in an area where vitrification is possible. However, when two or more of those components are contained in the glass composition, the glass durability may be increased again. This is called 'Mixed alkali effect'

The sum of $Na_2O$, $K_2O$ and $Li_2O$ may be added in a content ratio of 30 to 60 wt % of the total weight of the glass composition, and 40 to 50 wt % may be preferred. If the sum of $Na_2O$, $K_2O$ and $Li_2O$ is added in a content ratio exceeding 60 wt % of the total weight of the glass composition, there might be a problem of deteriorated durability and deteriorated washing performance for specific contaminants. Conversely, if the sum of $Na_2O$, $K_2O$ and $Li_2O$ is added in a content ratio less than 60 wt % of the total weight of the glass composition, there might be a problem of deteriorated washing performance.

However, when one of $Na_2O$, $K_2O$ and $Li_2O$ is contained in a large amount exceeding 30 wt %, vitrification might be difficult and thermal properties might be deteriorated. Accordingly, each of the $Na_2O$, $K_2O$ and $Li_2O$ may be added in an amount of 30 wt % or less of the total weight.

Meanwhile, the glass composition for washing according to the embodiment of the present disclosure may include 20 to 70 wt % of the glass composition and 30 to 90 wt % of the bleaching agent.

The bleaching agent may include one or more selected from oxygen-based oxidative bleaching agents including borax, potassium permanganate, and sodium perborate.

When the bleaching agent is added in an amount of 30 wt % or less of the total weight of the composite glass composition, it might be difficult to achieve power bleaching performance. Conversely, when the bleaching agent is added in an amount exceeding 80 wt % of the total weight amount of the glass composition, the content amount of the glass composition could be decreased to deteriorate durability and washing performance for specific contaminants could be deteriorated.

When using the conventional alkali ionized water alone, washing performance for oil contaminants may be achieved to some extent but washing performance for red wine containing anthocyanin as the main component may be significantly deteriorated.

To prevent the washing performance for various contaminants from deteriorating in advance, the bleaching agent having the bleaching effect may be mixed or coated with the silicate-based glass composition containing the alkali oxide to improve the washing performance for various contaminants or dirt in the present disclosure.

Generally, the color of contaminants may be expressed as conjugated bond absorbs light in the visible region. The bleaching agent may cut or oxidize the conjugated bond and shorten the chin not to absorb light in the visible region, thereby controlling the color expression.

As a result, the present disclosure may improve the washing performance for various contaminants such as oils, red wine by mixing or coating the glass composition with an oxygen-based oxidizing bleach configured to break or oxidize the conjugated bon causing color development or expression and shorten the chain.

Hereinafter, referring to the accompanying drawings, a method for producing composite glass powder for washing according to embodiments of the present disclosure will be described.

FIG. 1 is a flow chart showing a method for producing composite glass powder for washing according to an embodiment of the present disclosure.

As shown in FIG. 1, the method for producing the composite glass powder for washing according to this embodiment may include mixing S110, melting S120, cooling S130 and grinding S140.

Mixing

In the mixing process S110, 40 to 70 wt % of $SiO_2$, and 30 to 60 wt % of the sum of $Na_2O$, $K_2O$ and $Li_2O$ may be mixed and agitated, thereby preparing a glass composition. After that, a bleaching agent may be added to the glass composition and a composite glass composition may be prepared.

50 to 60 wt % of $SiO_2$ may be preferred.

Also, 30% or less of $Na_2O$, $K_2O$ and $Li_2O$ may be preferred, respectively.

In the mixing process, 20 to 70 wt % of the glass composition and 30 to 80 wt % of the bleaching agent may be mixed.

When the bleaching agent is added in an amount less than 30 wt % of the total weight of the composite glass composition, it could be difficult to perform bleaching. Conversely, when the bleaching agent is added in an amount exceeding 80 wt % of the total weight of the composite glass composition, durability could be deteriorated due to the decrease of the glass composition adding amount and washing performance for specific contaminants could be deteriorated.

Here, the bleaching agent may include one or more selected from oxygen-based oxide bleaching agents including borax, potassium permanganate and sodium perborate.

Melting

In a melting process S120, the composite glass composition may be melted.

In this process, melting may be performed at 1,200° C. to 1,300° C. for 1 to 60 minutes. When the melting temperature is lower than 1,200° C. or the melting time is less than 1 minute, the composite glass composition might be completely melted, thereby causing a problem of immiscibility of the glass melt. Conversely, when the melting temperature is higher than 1,300° C. or the melting time is over 60 minutes, excessive energy and time should be required, which is not economical.

Cooling

In the cooling process S130, the melted composite glass composition may be cooled to room temperature.

In the cooling process, cooling may be performed in a method of cooling in furnace. When air cooling or water cooling is applied, the internal stress of the antimicrobial glass might be severely formed and it might cause cracks in some cases. Accordingly, the cooling in furnace is preferred as the cooling method.

Grinding

In the grinding step S140, the cooled antimicrobial glass may be grinded. At this time, a dry grinder may be used for grinding.

The antimicrobial glass may be finely pulverized to prepare composite glass powder. The composite glass power may preferably have an average diameter of 30 µm or less. 15 to 25 may be more preferred.

The composite glass powder for washing may be produced according to the above-described processes S110 to S140.

The composite glass powder for washing according to the embodiment of the present disclosure produced through the above-described processes may be produced through a melting process of co-firing after mixing a silicate-based glass composition containing the alkali oxide for activating water with alkaline water and a bleaching agent having a bleaching performance.

Accordingly, the silicate-based glass composition containing the alkali oxide may ionize water by replacing the role of the surfactant contained in the conventional synthetic detergent, thereby securing the washing capacity that is equal to or more excellent than the conventional synthetic detergent due to the user of the alkali water ionized from water.

In addition, since the silicate-based glass composition containing the alkali oxide replaces the surfactant, the user of the surfactant that are not soluble in water and causes entrophication may be fundamentally excluded, thereby preventing environmental pollution problems in advance.

Figure 2:
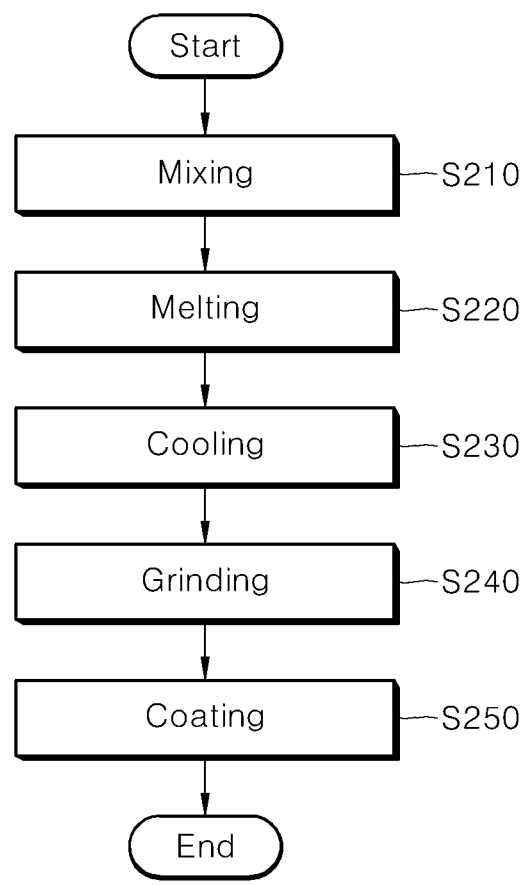
FIG. 2 is a flow chart showing a method for producing composite glass powder for washing and cleaning according to another embodiment of the present disclosure.

Meanwhile, FIG. 2 is a flow chart showing a method for producing composite glass powder for washing and cleaning according to another embodiment of the present disclosure.

As shown in FIG. 2, the method for producing the composite glass powder for washing according to this embodiment may include mixing S210, melting S220, cooling S230, grinding S240 and coating S250.

Mixing

In the mixing process S210, 40 to 70 wt % of $SiO_2$, and 30 to 60 wt % of the sum of $Na_2O$, $K_2O$ and $Li_2O$ may be mixed and agitated, thereby preparing a glass composition. After that, a bleaching agent may be added to the glass composition and a composite glass composition may be prepared.

50 to 60 wt % of $SiO_2$ may be preferred.

Also, 30 wt % or less of $Na_2O$, $K_2O$ and $Li_2O$ may be preferred, respectively.

Melting

In a melting process S220, the composite glass composition may be melted.

In this process, melting may be performed at 1,200° C. to 1,300° C. for 1 to 60 minutes. When the melting temperature is lower than 1,200° C. or the melting time is less than 1 minute, the composite glass composition might be completely melted, thereby causing a problem of immiscibility of the glass melt. Conversely, when the melting temperature is higher than 1,300° C. or the melting time is over 60 minutes, excessive energy and time should be required, which is not economical.

Cooling

In the cooling process S230, the melted composite glass composition may be cooled to room temperature.

In the cooling process, cooling may be performed in a method of cooling in furnace. When air cooling or water cooling is applied, the internal stress of the antimicrobial glass might be severely formed and it might cause cracks in some cases. Accordingly, the cooling in furnace is preferred as the cooling method.

Grinding

In the grinding step S240, the cooled glass may be grinded and glass powder may be gained. At this time, a dry grinder may be used for grinding.

The glass powder may have an average diameter of 30 µm or less. 15 to 25 may be more preferred.

Coating

In the coating process, a bleaching agent may be coated on the surface of the glass powder and the glass powder having the bleaching agent coated on its surface may be dried.

In this process, the coating may be performed so as to have a component ratio of 20 to 70 wt % of the glass powder and 30 to 80 wt % of the bleaching agent. At this time, the coating method may be a spray coating method. However, it may one of examples and various coating method may be applied. In other words, any methods capable of coating the bleaching agent with a uniform thickness on the surface of the glass powder may be applied without limitation.

In this instance, the bleaching agent may be coated to cover the entire surface of the glass powder.

When the bleaching agent is coated in an amount of less than 30 wt % of the total weight of the composition glass powder, it could be difficult to property express the bleaching performance. Conversely, when the bleaching agent is coated in an amount exceeding 80 wt % of the total weight of the composite glass powder, the added amount of the glass composition could be reduced, thereby deteriorating the durability and the washing performance for specific contaminants.

Here, the bleaching agent may include one or more selected from oxygen-based oxidative bleaching agents including borax, potassium permanganate, and sodium perborate.

The composite glass powder for washing may be produced according to the above-described processes S110 to S140.

The composite glass powder for washing according to the embodiment of the present disclosure produced through the above-described processes may coat the bleaching agent having the bleaching performance on the silicate-based glass powder containing the alkali oxide for activating water with alkaline water.

Accordingly, the silicate-based glass composition containing the alkali oxide may ionize water by replacing the role of the surfactant contained in the conventional synthetic detergent, thereby securing the washing capacity that is equal to or more excellent than the conventional synthetic detergent due to the user of the alkali water ionized from water.

In addition, since the silicate-based glass composition containing the alkali oxide replaces the surfactant, the user of the surfactant that are not soluble in water and causes entrophication may be fundamentally excluded, thereby preventing environmental pollution problems in advance.

In addition, since the silicate-based glass composition containing the alkali oxide replaces the surfactant, the user of the surfactant that are not soluble in water and causes entrophication may be fundamentally excluded, thereby preventing environmental pollution problems in advance.

EMBODIMENTS

Hereinafter, the configuration and operation of the present disclosure will be described in detail through exemplary embodiment of the present disclosure. The above-described aspects, features and advantages are specifically described hereunder with reference to the accompanying drawings such that one having ordinary skill in the art to which the present disclosure pertains can easily implement the technical spirit of the disclosure.

In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

1. Antimicrobial Glass Powder Preparation

Embodiment 1

An antimicrobial glass composition having the composition shown in Table 1 may be mixed and agitated, and the glass composition is formed after that. Borax is added to the glass composition in the composition ratio shown in Table 2, and the composite glass composition is prepared.

Next, the composite glass composition may be melted at a temperature of 1,200° C. in an electric furnace. After that, the melt glass composition may be cooled in on a stainless steel sheet in a glass bulk form by the air cooling method, thereby obtaining cullet-type composite glass. Then, the composite glass may be pulverized with a dry grinder (e.g., a ball mill) and passed through a 400-mesh sieve so that antimicrobial glass powder having a D90 particle size of 20 μm may be prepared.

In this instance, $Na_2CO_3$ and $K_2CO_3$ are used as raw materials for $Na_2O$ and $K_2O$, and the other components are the same as those shown in Table 1.

Embodiment 2

The composite glass composition having a D90 particle size of 17 μm is prepared in the same method as the method in Embodiment 1, except that the antimicrobial glass composition having the composition shown in Table 1 and the composition ratio shown in Table 2 is melted at a temperature of 1,260° C. in an electric furnace.

Embodiment 3

The composite glass composition having a D90 particle size of 18 μm is prepared in the same method as the method in Embodiment 1, except that the antimicrobial glass composition having the composition ratio shown in Table 1 and the composition ratio shown in Table 2 is melted at a temperature of 1,240° C. in an electric furnace.

TABLE 1

(Unit: % by weight)

| Classification | Embodiment 1 | Embodiment 2 | Comparative embodiment 1 |
|---|---|---|---|
| $SiO_2$ | 58.3 | 56.4 | 54.7 |
| $Na_2O$ | 21.5 | 19.3 | 20.4 |
| $K_2O$ | 11.2 | 10.5 | 12.6 |
| $Li_2O$ | 9.0 | 13.7 | 12.3 |

TABLE 2

| Classification | Composition |
|---|---|
| Comparative embodiment 1 | Indicator detergent |
| Comparative embodiment 2 | Alkali ionized water |
| Comparative embodiment 3 | Borax |
| Embodiment 1 | Glass composition:Borax (20 wt %:80 wt %) |
| Embodiment 2 | Glass composition:Borax (40 wt %:60 wt %) |
| Embodiment 3 | Glass composition:Borax (70 wt %:30 wt %) |

2. Washing Power Evaluation

[Table 3] shows result of washing power evaluation for Embodiment 1 to 3 and Comparative embodiments 1 to 3.

Here, the washing power evaluation is performed as follows.

First, contaminated cloths (i.e., JIS contaminated cloth and Red Wine contaminated cloth) and the indicator detergent and samples for determining the washing power according to Comparative embodiments 1 to 3 and Embodiments 1 to 3 are respectively put into a agitation-type washing power tester. Then, water at 30 is added to the tester.

Next, light pressing is performed to that the moisture content is 200% or less. After that, washing is repeated twice for 3 minutes at a speed of 120 rpm using the agitation-type washing power tester.

JIS contaminated cloth is the artificially contaminated cloth that is internationally recognized (KS M 2709 applied mutatis mutandis). Such the JIS contaminated cloth is wet artificial stained cloths which are complex stained cloth with oily substances, proteins, and inorganic components).

Once the washing is completed, the reflectance of the contaminated cloths is measured and the washing power is evaluated based on [Equation 1] below.

$$\text{Washing power (\%)} = \text{Whiteness after washing} - \text{Whiteness before washing})/(\text{Whiteness of original cloth} - \text{Whiteness before washing}) \times 100 \quad \text{Equation 1}$$

TABLE 3

| Classification | | Comparative embodiment 1 | Comparative embodiment 2 | Comparative embodiment 3 |
|---|---|---|---|---|
| Washing power (%) | Contaminated cloth (JIS contaminate cloth) | 42.6 | 50.2 | 40.1 |
| | Contaminated cloth (JIS contaminate cloth) | 51.2 | 37.5 | 64.1 |

| Classification | | Embodiment 1 | Embodiment 2 | Embodiment 3 |
|---|---|---|---|---|
| Washing power (%) | Contaminated cloth (JIS contaminate cloth) | 45.1 | 54.9 | 56.4 |
| | Contaminated cloth (JIS contaminate cloth) | 63.4 | 61.8 | 52.5 |

According to the result of the washing power evaluation as shown in Table 1 to 3, it means that an indicator detergent corresponding to Comparative embodiment 1 can be launched as a detergent produce, when having the washing power equal to or greater than the washing power.

It is confirmed that Embodiments 1 to 3 have the greater washing power than Comparative embodiment 1 using the indicator detergent.

In particular, it is confirmed that Embodiment 2 in which the glass composition and borax are mixed in an amount ratio of 40 wt % and 60 wt %, is measured to have the washing power of 54.9 for JIS contaminated cloth and 61.8% for the wine contaminated cloth, thereby being confirmed that it has the best washing power.

On the other hand, Comparative embodiment 2 using only the alkali ionized water is measured to have the washing power of 50.2% for JIS contaminated cloth and the washing power of 37.5% for the wine contaminated cloth, thereby being confirmed that it has quite a bad washing power for the wind contaminated cloth.

Comparative embodiment 3 using only borax is confirmed to have an excellent washing power for the wine contaminated cloth but only 40.1% of the washing power for the JIS contaminated cloth, thereby being confirmed that it has the bad washing power for the JIS contaminated cloth.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

NUMERAL DESCRIPTION

S110: Mixing
S120: Melting
S130: Cooling
S140: Grinding

What is claimed is:

1. A composite glass composition comprising:
   a glass composition comprising $SiO_2$, $Na_2O$, $K_2O$, and $Li_2O$; and
   a bleaching agent mixed with the glass composition,
   wherein the glass composition comprises:
      40 to 70 wt % of $SiO_2$; and
      30 to 60 wt % of a sum of $Na_2O$, $K_2O$, and $Li_2O$.

2. The composite glass composition of claim 1, wherein the glass composition comprises 50 to 60 wt % of $SiO_2$.

3. The composite glass composition of claim 1, wherein the glass composition comprises 30 wt % or less, respectively of $Na_2O$, $K_2O$, and $Li_2O$.

4. The composite glass composition of claim 1, wherein the composite glass composition comprises:
   20 to 70 wt % of the glass composition, and
   30 to 80 wt % of the bleaching agent.

5. The composite glass composition of claim 1, wherein the bleaching agent comprises one or more of borax, potassium permanganate, or sodium perborate.

6. A method for producing the composite glass powder of claim 1, the method comprising:
   forming the glass composition by mixing and agitating the 40 to 70 wt % of $SiO_2$, and the 30 to 60 wt % of the sum of $Na_2O$, $K_2O$, and $Li_2O$;
   forming the composite glass composition by adding and mixing the bleaching agent to the glass composition;
   melting the composite glass composition;
   cooling the melted composite glass composition; and
   grinding the cooled composite glass composition.

7. The method for producing the composite glass powder of claim 6, wherein forming the composite glass composition includes mixing 20 to 70 wt % of the glass composition with 30 to 80 wt % of the bleaching agent.

8. The method for producing the composite glass powder of claim 6, wherein the bleaching agent comprises one or more of borax, potassium permanganate, or sodium perborate.

9. The method for producing the composite glass powder of claim 6, wherein the grinded composite glass powder has an average diameter of 30 μm or less.

10. A method for producing the composite glass powder of claim 1, the method comprising:
    forming a glass composition by mixing and agitating the 40 to 70 wt % of $SiO_2$, and the 30 to 60 wt % of the sum of $Na_2O$, $K_2O$, and $Li_2O$;
    melting the glass composition;
    cooling the melted glass composition; and
    forming a glass powder by grinding the cooled glass; and
    coating the bleaching agent on the surface of the glass powder, and drying the glass powder having the surface coated with the bleaching agent to form the composite glass powder.

11. The method for producing the composite glass powder of claim 10, wherein the bleaching agent is coated to cover an entirety of the surface of the glass powder.

12. The method for producing the composite glass powder of claim 10, wherein the composite glass powder includes 20 to 70 wt % of the glass powder, and 30 to 80 wt % of the bleaching agent.

13. The method for producing the composite glass powder of claim 10, wherein the bleaching agent comprises one or more of borax, potassium permanganate, or sodium perborate.

14. The method for producing the composite glass powder of claim 10, wherein the glass powder has an average diameter of 30 μm or less.

* * * * *